United States Patent
Reisacher et al.

(10) Patent No.: US 6,428,615 B1
(45) Date of Patent: Aug. 6, 2002

(54) PHOSPHATIC PIGMENT PREPARATIONS

(75) Inventors: Hansulrich Reisacher, Maxdorf; Oliver Seeger, Mannheim, both of (DE)

(73) Assignee: BASF Aktiengesellschaft, Ludwigshaften (DE)

( * ) Notice: Subject to any disclaimer, the term of this patent is extended or adjusted under 35 U.S.C. 154(b) by 10 days.

(21) Appl. No.: 09/597,463

(22) Filed: Jun. 19, 2000

(30) Foreign Application Priority Data

Jul. 21, 1999 (DE) .......................... 199 34 206

(51) Int. Cl.[7] .............................. C04B 14/00; C09C 1/36
(52) U.S. Cl. .................. 106/479; 106/436; 106/443
(58) Field of Search .................. 106/479, 436, 106/443; 524/417, 480, 497

(56) References Cited

U.S. PATENT DOCUMENTS

| | | | |
|---|---|---|---|
| 3,946,134 A | | 3/1976 | Sherman .................. 428/403 |
| 4,115,141 A | | 9/1978 | Piltingsrud .............. 106/288 B |
| 4,230,500 A | * | 10/1980 | Balducci et al. ............ 106/479 |
| 4,455,174 A | | 6/1984 | Wienand et al. ......... 156/288 B |
| 4,752,460 A | | 6/1988 | Herren ..................... 423/593 |
| 4,937,063 A | * | 6/1990 | Sullivan ................... 106/479 |
| 5,123,965 A | | 6/1992 | Herren et al. ............... 106/462 |
| 5,186,748 A | | 2/1993 | Erkens et al. ............... 106/479 |
| 5,203,917 A | | 4/1993 | Schwochow ................ 106/479 |
| 5,273,577 A | | 12/1993 | Liedek et al. ............... 106/479 |
| 5,399,197 A | | 3/1995 | Vermoortele et al. ....... 106/479 |
| 5,399,335 A | * | 3/1995 | Sullivan .................... 106/479 |
| 5,536,309 A | * | 7/1996 | Etzrodt et al. .............. 106/479 |
| 5,672,200 A | | 9/1997 | Heinz et al. ................. 106/403 |
| 5,693,136 A | * | 12/1997 | Vermoortele et al. ....... 106/479 |
| 5,753,028 A | | 5/1998 | Ochmann et al. ........... 106/479 |
| 5,851,587 A | * | 12/1998 | Schittenhelm et al. ...... 106/479 |
| 5,853,472 A | * | 12/1998 | Erkens et al. ............... 106/479 |
| 5,958,126 A | * | 9/1999 | Adel et al. .................. 106/479 |

FOREIGN PATENT DOCUMENTS

| | | |
|---|---|---|
| DE | 198 40 156 A 1 | 3/2000 |
| EP | 0 074 049 | 3/1983 |
| EP | 0 239 526 | 9/1987 |
| EP | 0 430 888 A1 | 6/1991 |
| EP | 0 492 244 A1 | 7/1992 |
| EP | 0 551 637 A1 | 7/1993 |
| EP | 0 640 566 A1 | 3/1995 |
| EP | 0 721 005 A1 | 7/1996 |
| EP | 0 758 670 A2 | 2/1997 |
| WO | WO 92/11205 | 7/1992 |

OTHER PUBLICATIONS

Ullmann's Encyclopedia of Industrial Chemistry, 5th Edition, vol. A20, 1992, pp. 307–308 month not avail.
Ullmann's Encyclopedia of Industrial Chemistry, 5th Edition, vol. A18, 1991, pp. 387, 405–406 month not avail.

* cited by examiner

*Primary Examiner*—Mark L. Bell
*Assistant Examiner*—Patricia L. Hailey
(74) *Attorney, Agent, or Firm*—Oblon, Spivak, McClelland, Maier & Neustadt, P.C.

(57) ABSTRACT

Pigment preparations including as essential blending components

A) an inorganic pigment from the group of the bismuth vanadate pigments and rutile pigments and B) a phosphate,
are produced and used for coloring polymeric materials.

12 Claims, No Drawings

PHOSPHATIC PIGMENT PREPARATIONS

DESCRIPTION

The present invention relates to novel pigment preparations including as essential blending components
  A) an inorganic pigment from the group of the bismuth vanadate pigments and rutile pigments and
  B) a phosphate.

It further relates to the production of these pigment preparations and to their use for coloring polymeric materials.

It further relates to coating compositions including a film-forming polymer, a pigment from the group of the bismuth vanadate pigments and rutile pigments and a phosphate as well as further ingredients customary for these coating compositions.

Bismuth vanadate pigments are well known. As well as pure $BiVO_4$ pigments, there are a number of $BiVO_4$ pigments in which some of the metal and/or oxygen atoms are replaced by other metals and/or nonmetals. These pigments are interesting nontoxic yellow pigments and are particularly useful for coloring paints and plastics. To improve their application properties such as thermostability, weatherfastness and chemical resistance, bismuth vanadate pigments are frequently provided with protective sheaths made of metal phosphates (U.S. Pat. No. 4,115,141, U.S. Pat. No. 5,123,965 and DE-A-198 40 156, which was unpublished at the priority date of the present invention, but also with protective sheaths made of metal oxides and/or metal fluorides. These protective sheaths are nonporous and continuous and are produced by precipitating the phosphates, oxides or hydroxides and fluorides from preferably aqueous solutions of soluble salts of the corresponding metals.

Such stabilizing coatings are also well known for rutile pigments (e.g. U.S. Pat. No. 3,946,134). A particularly important group of rutile pigments is the group of colored rutile mixed-phase pigments which are obtained through incorporation in the rutile crystal lattice of transition metals which form colored oxides.

EP-A-721 005 describes printing ink pigment preparations which are based on luster pigments and further include an alkali metal polyphosphate and also spherical particles. The additional components are used in order to reduce print-run stability problems typical of platelet-shaped pearl luster pigments.

Existing bismuth vanadate pigments and rutile pigments may give rise to problems on incorporation into varnishes. More particularly, when these pigments are incorporated into two-component coating systems, it is observed that the viscosity of the varnish increases very rapidly and that processing is possible only for a short period.

It is an object of the present invention to remedy these defects and to provide pigment preparations having advantageous application properties.

We have found that this object is achieved by pigment preparations including as essential blending components
  A) an inorganic pigment from the group of the bismuth vanadate pigments and rutile pigments and
  B) a phosphate.

The invention further provides a process for producing these pigment preparations, which comprises milling the as-synthesized crude pigment together with said phosphate.

The invention further provides for the use of the pigment preparations for coloring polymeric materials.

The invention additionally provides coating compositions including a film-forming polymer, a pigment from the group of the bismuth vanadate pigments and rutile pigments and a phosphate as well as further ingredients customary for these coating compositions.

Useful blending components (A) for pigment preparations according to the invention include all known bismuth vanadate pigments and rutile pigments. Reference is made by way of example to pigments known from the following publications: EP-A-074 049, 239 526, 430 888, 492 244, 551 637, 640 566, 758 670 and WO-A-92/11205 and also Ullmann's Encyclopedia of Industrial Chemistry, 5th Ed., Vol. A20, 307–308 (1992).

It will be appreciated that the pigment preparations of the invention may also include mixtures of these pigments.

The phosphate component (B) may be in particular an inorganic phosphate, in which case preference is given to metal phosphates which are essentially insoluble in substantially neutral aqueous media, in particular in water.

All known phosphates are suitable, i.e., mono-, di-, poly- or metapolyphosphates, although orthophosphates (monophosphates) are particularly suitable. Orthophosphates may include further anions such as hydroxide and/or halide ions such as fluoride and chloride ions.

Preferred metals for metal phosphates are boron, aluminum, zinc or an alkaline earth metal such as magnesium, calcium, strontium or barium. Particular preference is given to calcium and aluminum. Mixed salts may also be present.

Examples of phosphates to be used according to the invention are: $BPO_4$, $AlPO_4$, $Al_2PO_4(OH)_3$, $Al_3(PO_4)_2(OH,F)_3$, $Zn_3(PO_4)_2$, $Zn_2P_2O_7$, $Mg_3(PO_4)_2$, $Mg_2P_2O_7$, $Ca_3(PO_4)_2$, $Sr_3(PO_4)_2$, $Ba_3(PO_4)_2$, $Ca_5(PO_4)_3OH$, $Ca_5(PO_4)_3F$, $Ca_5(PO_4)_3Cl$, $Ca_5(PO_4)_3(OH,F,Cl)$, $Na_{n+2}P_nO_{3n+1}$ (n=2–10), $Na_nH_2P_nO_{3n+1}$ (n=16–90), $Na_nP_nO_{3n}$ (n≧3). Calcium phosphates and aluminum phosphates are preferred, and $Ca_5(PO_4)_3OH$ and $AlPO_4$ are particularly preferred. Mixtures of these phosphates are also useful as component (B).

Pigment (A) and phosphate (B) are present in the pigment preparations of the invention as separate, distinct blending components in that the pigment particles have not been provided with a sheath of phosphate (B).

In general, pigment preparations according to the invention include from 50 to 99%, preferably from 55 to 99%, preferably from 70 to 97%, particularly preferably from 80 to 95%, by weight of pigment (A) and from 1 to 50%, preferably from 3 to 30%, particularly preferably from 5 to 20%, by weight of phosphate (B).

Pigment preparations according to the invention are advantageous to produce using the process of the invention by milling the as-synthesized crude pigment together with the phosphate.

Milling may take the form of wet milling or dry milling, wet milling being preferred.

The crude pigment may be used for example as moist filtercake or as pigment clinkers obtained from the calcination following the synthesis. The pigment, if desired, may already be coated with one of the stabilizing coatings mentioned, but the particle size and shape of the pigment is still to be finalized.

Wet milling is preferably carried out in an aqueous medium. However, suitable media also include organic solvents which may be protic or a protic, and also mixtures of these solvents with each or one another and/or with water. It is favorable to use the liquid used in the final wash of the crude pigment.

Examples of suitable protic organic solvents are monohydric aliphatic alcohols, especially $C_1$–$C_{12}$ alcohols, and also polyhydric alcohols, especially $C_2$–$C_3$ alkylene glycols, and ether alcohols, especially $C_2$–$C_3$ alkylene glycol-$C_1$–$C_4$ alkyl ethers. Specific examples are ethanol, propanol, diethylene glycol and ethylene glycol monobutyl ether.

Examples of suitable aprotic organic solvents are cyclic ethers such as tetrahydrofuran.

The pigment is customarily used in wet milling in the form of a from 10 to 60% strength by weight suspension of the pigment in the solvents mentioned.

Wet milling on an industrial scale may with advantage be effected in an unstirred ball mill or in a stirred ball mill, preferably operated at from 100 to 2000 rpm. Examples of suitable grinding media are glass beads, zirconia beads or sand grains, preferably from about 0.4 to 30 mm in diameter. Milling on a laboratory scale may be carried out, for example, in vibromills and shakers containing grinding media.

For dry milling, ball mills and jet mills are correspondingly suitable.

Milling is customarily carried on until the median pigment particle size ($d_{50}$ value) is within the range from about 0.4 to 2 μm, preferably from 0.5 to 1.5 μm. The phosphate particle size is advantageously also within these ranges. If appropriate, it is advisable to premill the phosphate. Its particle size should not be >5 μm prior to the conjoint milling.

After the grinding media have been removed, the phosphatic pigment suspension obtained in wet milling is dried, preferably with agitation.

Examples of apparatus particularly suitable for the large industrial scale include tumble dryers, paddle dryers and force cleaned contact dryers, in each of which drying is preferably effected under reduced pressure (a pressure within the range from about 50 to 500 mbar). If appropriate, an additional coarse comminution step may be effected in or outside the drying apparatus.

The drying step may with advantage also be carried out in a spray-drying plant in which the suspension to be spray dried is agitated in the feed vessel by stirring. Examples of suitable spray dryers are tower type spray dryers and fluidized bed spray dryers where the solvent, preferably water, is evaporated by contacting with a hot gas, for example air or nitrogen. The granules can then be directly obtained in the desired particle size.

The pigment preparations of the invention may also be produced by dry mixing of pigment powder and phosphate. In this case it is advisable, however, to use a previously finished pigment—that is, a pigment already adjusted to the desired pigment particle size.

The pigment preparations of the invention are very useful for coloring polymeric materials such as paints, plastics and printing inks. Incorporation into two-component coating systems in particular provides low viscosity systems whose processing is possible for a prolonged period (customarily from 6 to 8 h). This effect is particularly pronounced in the case of pigment preparations obtainable according to the process of the invention by wet milling the crude pigment with the phosphate. In addition, pigment preparations obtainable in this way have surprisingly high color strengths, which are superior to those of preparations obtained by mixing the finished pigment with the phosphate.

Two-component coating systems are well known; cf. Ullmann's Encyclopedia of Industrial Chemistry, 5th Ed., Vol. A18, 387, 405–406 (1991). One component in these systems is a polyisocyanate which acts as a curing agent, while the other component is a polyhydroxy compound. As well as polyester—and polyetherpolyols examples of useful components include hydroxyl-functional acrylic resins, epoxy resins, phenolic resins, alkyd resins, castor oil, castor oil derivatives, polyamines, unsaturated polyester resins, certain polychloroprene grades, silicone resins, coaltar, nitrocellulose and cellulose acetate butyrate.

Coating compositions according to the invention are advantageously produced by first producing the pigment preparation of the invention and then incorporating it into the binder system of the coating. If previously finished pigment is present, pigment and phosphate may also be added without prior mixing.

EXAMPLES

Production and use of bismuth vanadate pigment preparations according to the invention The crude bismuth vanadate pigment was synthesized similarly to Example 10 of EP-A-551 637.

Pigment preparations were subsequently produced according to one of the following process variants:

Variant A:

A mixture of x g of crude bismuth vanadate pigment (A), y g of the phosphate (B) reported in the table and 60 g of water was milled with 90 g of glass beads (1 mm in diameter) on a 200 ml capacity Skandex machine for 20 min. The glass beads were removed, and the pigment preparation obtained was dried at 120° C.

Variant B:

A pigment preparation was produced similarly to variant A using a previously finished bismuth vanadate pigment, i.e., using a bismuth vanadate pigment synthesized as reported above and subsequently ground to a median particle size ($d_{50}$ value) of 0.8 μm.

Variant C:

A mixture of x g of a bismuth vanadate pigment finished as in variant B (A) and y g of the phosphate (B) reported in the table was ground in a Janke & Kunkel laboratory mill for 30 sec.

The color strength of the pigment preparations obtained is reported in terms of coloring equivalents (CE) and was determined via the white reduction of a paint prepared in each case as follows:

A mixture of 36 g of alkyd-melamine baking varnish having a solids content of 56% by weight, 1.5 g of each pigment preparation and 7.5 g of 2056 titanium dioxide from Kronos were shaken on a Skandex machine with 70 g of glass beads 1 mm in diameter for 60 min and then hidingly applied to aluminum Q-Panels using an Erichsen model 238 II film applicator and baked at 140° C. for 30 min.

The CIELAB color coordinates were measured using a Zeiss RFC 16 spectrophotometer and converted into coloring equivalents.

The analogous coating which contained only the finished pigment and no phosphate was assigned the CE value of 100 (standard). CE values <100 mean higher color strength than that of the standard, CE values >100 accordingly a lower color strength.

The viscosity of a two-component coating pigmented with the pigment preparations obtained was determined as follows:

A mixture of 113 g of acrylic resin (60% strength by weight solution in a mixture of xylene (20%), butyl acetate and hydrocarbons; Macrynal® SM 510n, from Vianova Resins; corresponding to a 40% by weight solids content in butyl acetate), 0.68 g of dibutyltin dilaurate and 37.5 g of each pigment preparation was shaken on a Skandex machine with 200 g of glass balls 3 mm in diameter for 120 min. The glass balls were removed, and 120 g of each suspension obtained were admixed with 24 g of aliphatic polyisocyanate (75% by weight solution in 1:1 v/v 2-methoxy-1-methylethyl acetate/xylene; Desmodur®, from Bayer).

The viscosity was then determined by measuring the efflux time of the pigmented varnish from an efflux cup having a nozzle diameter of 4 mm. To this end, the efflux time of each suspension obtained was initially adjusted to 18 sec by addition of 8:2 v/v butyl acetate/xylene.

After 4 h, the efflux time of the pigmented varnishes was compared with the nonpigmented varnish as null sample, which had an efflux time of 41 sec. Shorter efflux times mean a lower viscosity than that of the null sample, longer efflux times correspondingly a higher viscosity.

Further details concerning these tests and their results are recited in the table below. In the case of the varnishes of Examples 6 and 7, the finished bismuth vanadate pigment and the phosphate were added separately to the varnish system.

TABLE

| Ex. | Variant | x g of $BiVO_4$ (A) | y g | phosphate (B) | % by weight (A) | % by weight of 0B) | CE | Efflux time [sec] |
|---|---|---|---|---|---|---|---|---|
| 1 | A | 32.0 | 5.6 | $Ca_5(PO_4)_3OH$ | 85 | 15 | 105 | 32 |
| 2 | A | 35.6 | 1.8 | $Ca_5(PO_4)_3OH$ | 95 | 5 | 102 | 36 |
| 3 | A | 26.2 | 11.2 | $Ca_5(PO_4)_3OH$ | 70 | 30 | 110 | 32 |
| 4 | B | 33.8 | 3.8 | $Ca_5(PO_4)_3OH$ | 90 | 10 | 105 | 43 |
| 5 | C | 35.6 | 1.8 | $Ca_5(PO_4)_3OH$ | 95 | 5 | 106 | 43 |
| 6 | — | 32.0 | 5.6 | $Ca_5(PO_4)_3OH$ | 85 | 15 | 118 | 40 |
| 7 | — | 35.6 | 1.8 | $Ca_5(PO_4)_3OH$ | 95 | 5 | 105 | 44 |
| 8 | A | 32.0 | 5.6 | $AlPO_4$ | 85 | 15 | 104 | 36 |

We claim:

1. A pigment composition, comprising:
   A) an inorganic pigment, optionally comprising a phosphate and selected from the group consisting of bismuth vanadate pigments and rutile pigments; and
   B) a phosphate;
   wherein A and B are present in admixture.

2. The pigment composition as claimed in claim 1, including from 50 to 99% by weight of said component (A) and from 1 to 50% by weight of said component (B).

3. The pigment composition as claimed in claim 1, including an inorganic phosphate as component (B).

4. The pigment composition as claimed in claim 1, wherein said component (B) is an orthophosphate which may contain hydroxide and/or halide ions.

5. The pigment composition as claimed in claim 1, wherein said component (B) is a phosphate of boron, aluminum, zinc and/or an alkaline earth metal.

6. A process for producing the pigment composition as set forth in claim 1, which comprises milling the pigment together with said phosphate.

7. A process as claimed in claim 6, wherein said milling is wet milling and the as-milled pigment suspension is subsequently dried.

8. A method of coloring polymeric materials, which comprises incorporating the pigment composition as set forth in claim 1 into said polymeric materials.

9. A coating composition, comprising:
   a film-forming polymer, and
   the pigment composition as claimed in claim 1.

10. A two-component coating composition, comprising:
    a curing agent, and
    the pigment composition as claimed in claim 1.

11. The two-component coating composition as claimed in claim 10, further comprising a polyhydroxy compound.

12. The two-component coating composition as claimed in claim 10, further comprising at least one selected from the group consisting of polyesterphenol, polyetherphenol, hydroxyl-functional acrylic resin, epoxy resin, phenolic resin, alkyd resin, castor oil, caster oil derivative, polyamine, unsaturated polyester resin, polychloroprene, silicone resin, coaltar, nitrocellulose, and cellulose acetate butyrate.

* * * * *